July 20, 1954 K. J. KRUKOWSKI 2,684,256
IRRIGATING PIPE COUPLING
Filed Nov. 21, 1950 2 Sheets-Sheet 1
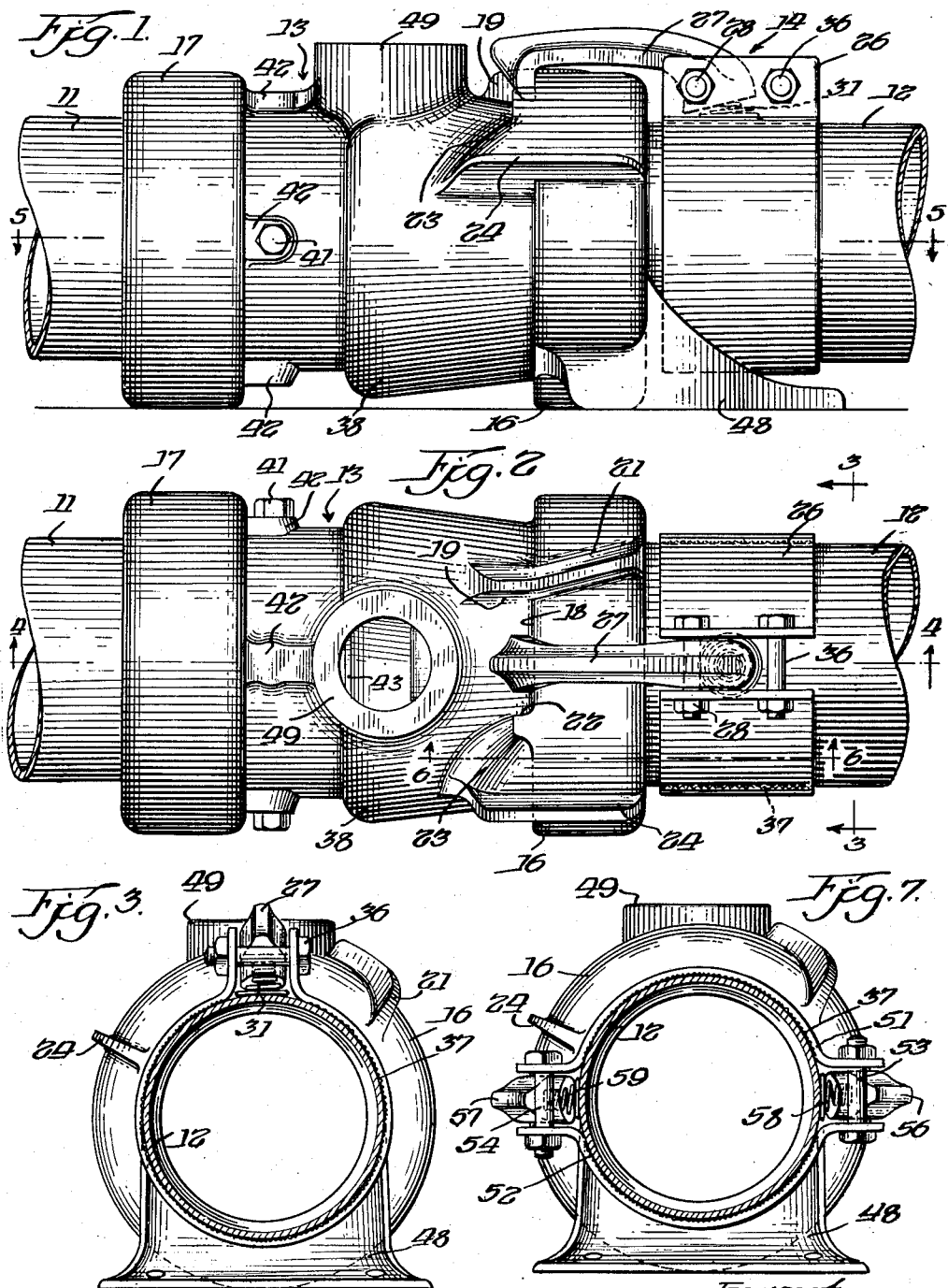
Inventor
Kasmir J. Krakowski

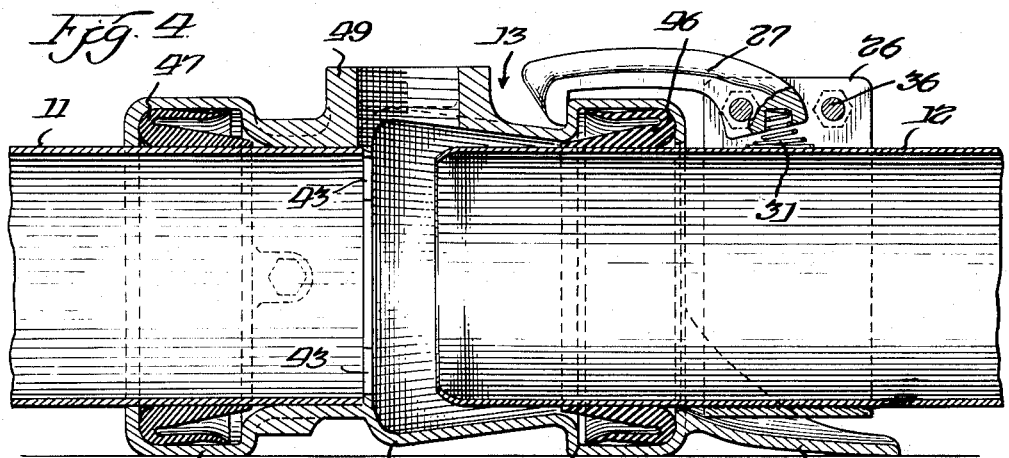
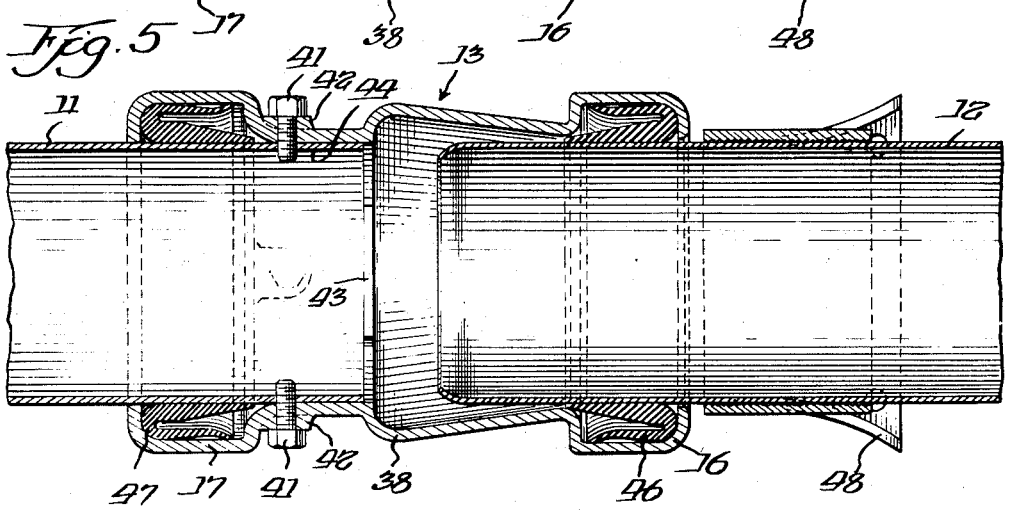
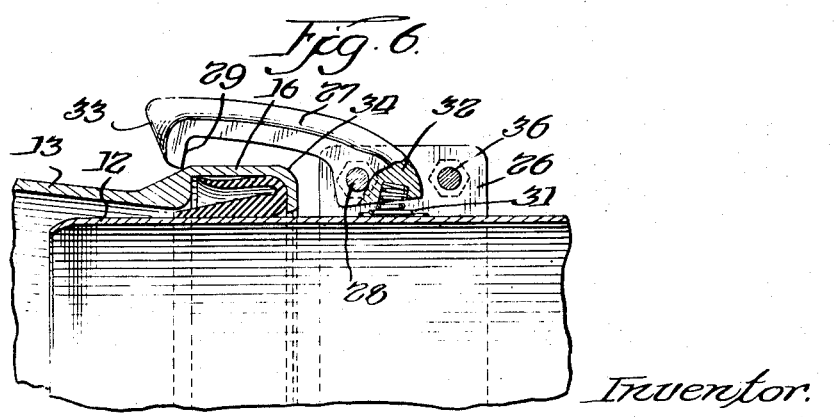

Patented July 20, 1954

2,684,256

UNITED STATES PATENT OFFICE 2,684,256

IRRIGATING PIPE COUPLING

Kasmir J. Krukowski, Calumet City, Ill., assignor to Champion Corporation, Hammond, Ind., a corporation of Indiana Application November 21, 1950, Serial No. 196,785

4 Claims. (Cl. 285—172)

The present invention relates to a pipe coupling, and more particularly to a pipe coupling for use on farm irrigation piping systems.

In irrigating piping systems, it is desirable to utilize as little piping as possible to supply a required or optimum amount of water to the fields being irrigated. To meet this condition, it is essential that the system include a minimum number of pipe sections, therefore, the sections must be easily coupled and uncoupled so that they can be moved from one part of a field to another with very little effort and in a short period of time. Further, in order that the system be usable on uneven or rolling ground, it must be capable of allowing a certain amount of misalignment between the longitudinal axes of the pipes of which it is composed. Also, it is necessary that the system cannot be easily disassembled accidentally due to rotation of the pipes, or the like, and it must be sufficiently sturdy so that it can be used with water supplies of varying pressures.

It is therefore one object of the present invention to provide an irrigation pipe coupling which facilitates coupling and uncoupling of the pipe sections of an irrigating system in which it is used, thereby allowing quick and easy movement of the system from one part of a field to another.

Another object of the invention is to provide a quick-acting pipe coupling that positively maintains the pipes it joins in assembled relation, and cannot be easily disassembled accidently.

A further object of the invention is to provide an irrigation pipe coupling that allows sufficient misalignment of the longitudinal axes of the pipes it joins so that the system in which it is used can be set up over uneven ground.

A still further object of the invention is to provide a novel pipe coupling that is durable and can be used for irrigation systems having water supplies of varying pressures.

A feature of the invention is the provision of an irrigation pipe coupling which includes a tubular member having a latching portion formed by a stepped surface running transversely to the longitudinal axis of the tubular member. Stop means comprising shoulders are formed on each side of the latching portion and a sloping surface or uncoupling ramp by-passing one of the stop means is provided which leads from behind the latching portion to the exterior surface of a pipe receiving edge of the tubular member. The coupling further includes a hook member adapted to be mounted on the end of one of the pipes to be coupled for engaging the latching portion of the tubular member to maintain the pipe and member in coupled relation.

Another feature of the invention is the provision of a novel irrigation pipe coupling including a tubular member for receiving the ends of a pair of pipes to be coupled, the tubular member having an outwardly flaring flange portion for accommodating movement of the longitudinal axes of each of the pipes being coupled relative to each other.

A further feature of the invention is the provision of an irrigation pipe coupling including a tubular member for receiving the ends of a pair of pipes to be coupled. The member has a plurality of bolt receiving bosses spaced around its periphery in a plane near one of the pipe receiving ends thereof, and has an inwardly projecting protrusion spaced inwardly from the plane containing the plurality of bosses for properly aligning the pipe being coupled with the plurality of bosses in the tubular member so that a minimum length of pipe is provided between the end of the pipe and holes punched therein for receiving bolts set in said bosses.

Many other objects and advantages of the construction herein shown and described will be obvious to those skilled in the art from the disclosure herein given when considered in connection with the accompanying drawings, wherein like reference characters indicate like or corresponding parts, and wherein:

Fig. 1 is a side elevational view of a pair of irrigation pipes joined together by a novel irrigation pipe coupling comprising the invention;

Fig. 2 is a plan elevational view of the pipes and coupling shown in Fig. 1;

Fig. 3 is an end view of the pipes and coupling illustrated in Fig. 2, taken through plane 3—3 of Fig. 2;

Fig. 4 is a sectional view of the pipes and coupling taken through plane 4—4 of Fig. 2;

Fig. 5 is a longitudinal, sectional view of the pipes and coupling taken through plane 5—5 of Fig. 1;

Fig. 6 is a fragmentary, sectional view of the coupling taken through plane 6—6, Fig. 2, and showing the construction of a latching member comprising a part of the novel pipe coupling; and Fig. 7 is an end view of a modified form of a coupling similar in construction to that shown in Figs. 1 and 2.

In practicing the invention, a novel, quick acting irrigation pipe coupling for joining a pair of irrigation pipes together is provided. The coupling includes a tubular member adapted to receive the ends of each of the pipes to be joined, and having a latching portion formed by a stepped portion on one end thereof running transversely to the longitudinal axis of the tubular member. Stop means may be provided on each side of the latching portion, and a sloping surface comprising an uncoupling ramp leads from the area immediately inward from the latching portion to the exterior surface of one of the pipe receiving edges of the tubular member and bypasses one of the stop means. The coupling also includes a hook member adapted to be mounted on the end of one of the pipes to be coupled for engaging the above-mentioned latching portion to thereby maintain the pipe on which it is mounted and the tubular member in assembled relation. In order to provide for misalignment of the longitudinal axes of the two pipes being coupled relative to each other, the tubular member preferably includes an outwardly flaring flange portion for accommodating such misalignment. To insure that the pipes being joined are securely coupled, the tubular member may have a plurality of bolt receiving bosses formed around its periphery. Spaced inwardly from the plane passing through the plurality of bosses is an inwardly projecting protrusion formed on the interior surface of the tubular member. The distance that the protrusion is spaced from the aforementioned plane is such that upon a pipe being inserted in said end and abutting said projection, a critical length of piping is available between the end of such pipe and holes formed therein so as to coincide with the bolt receiving bosses. The critical length of piping is sufficient to resist rupture upon the pipe and tubular member being tensioned apart.

Referring now to Fig. 1 of the drawings, a pair of irrigating pipe sections 11 and 12, comprising a part of an irrigation system, is shown. Pipe sections 11 and 12 are coupled together by a novel pipe coupling system comprising the invention, and including a tubular member, indicated at 13, and a latching member, indicated at 14.

Tubular member 13 may be generally cylindrical in shape, and preferably has an outwardly flaring, annular flange 16 formed on one of its ends, and a similar flange 17 formed on its remaining end. As is best shown in Fig. 2, flange 16 forms a stepped or latching portion 18 running transversely to the longitudinal axis of the tubular member on its upper side. Latching portion 18 is bordered on one side by a first stop means comprising a stop shoulder 19 formed on one side of the latching portion. Stop shoulder 19 is integral with an outwardly flaring guide shoulder 21 formed on flange 16 and leading from stop shoulder 19 to the pipe receiving edge of flange 16. On the side of latching portion 18, opposite stop shoulder 19, is a second stop means comprising stop shoulder or lug 22 formed integrally with flange 16, and by-passed by a sloping surface or uncoupling ramp 23. Ramp 23 leads from the area immediately inward from latching portion 18 to the exterior surface and pipe receiving edge of flange 16 and, as will be described more fully hereinafter, provides a quick acting uncoupling means. The side of ramp 23 away from latching portion 18 is bordered by a second guide and stop shoulder 24, which together with guide shoulder 21 serves to segregate latching portion 18 from the remainder of flange 16.

Latching portion 18 is adapted to cooperate with latching member 14 which preferably comprises a split, cylindrical bracket 26 having a plurality of directionally applied serrations or ridging formed on its interior surface and pivotally supporting a latching hook 27 by means of a bolt 28. As is best shown in Fig. 6 of the drawings, hook 27 has a hooked end 29 biased downwardly by means of a biasing spring 31 supported on pipe 12 by bracket 26, and a lever arm portion 32 of latching hook 27. The leading end portion 33 of latching hook 27 has a rearwardly extending slope so that upon pipe 12 being slid into tubular member 13, sloping surface 33 engages a complementary sloping surface 34 on the pipe receiving edge of flange 16 so as to facilitate coupling together of the pipe and tubular member. As is best seen in Figs. 2 and 3 of the drawings, bracket 26 is fixedly mounted on pipe 12 by means of a tightening bolt 36 and a plurality of peripheral ridges 37 cut into the inner surface thereof. Upon taking up tightening bolt 36 which is supported in the separated ends of bracket 26, the side of bracket 26 is pulled radially inward clamping the sides together and causing the peripheral ridges to bite into the pipe thereby rigidly securing bracket 26 to pipe 12 and preventing longitudinal and rotational movement of the two with respect to each other.

In order to assemble the two pipe sections 11 and 12 together after latching member 14 has been secured to pipe 12 in the above described manner, the end of pipe 12 is aligned with the first pipe receiving end 16 of tubular member 13. Pipe section 12 is then thrust inwardly, and the sloped end 33 of latching hook 27 brought into engagement with the sloping edge of flange 16. Further inward movement of pipe section 12 thereafter causes the hooked end 29 of latching hook 27 to be raised upwardly against the action of biasing spring 31, allowing pipe section 12, and latching member 14 to travel inwardly toward tubular member 13. Upon the hook portion 29 of the latching hook 27 coming into alignment with latching portion 18 of tubular member 13, the latching hook drops down due to the action of pipe spring 31, and thereafter holds the two members in assembled relation. During the coupling action, the guide shoulders 24 and 21 serve to maintain latching hook 27 within the desired area for bringing about a quick and easy latching or coupling action. After the two members have been coupled together, relative rotational movement of pipe section 12 and tubular member 13, is limited by the stop shoulders 19 and 22 so that the two members cannot be easily disassembled accidentally but that the transverse axis of the two may be rotated in respect to each other sufficient to allow for any irregularity in uneven ground. In order to disassemble the pipe section 12 from tubular member 13, the pipe section is pressed inwardly toward the tubular member, causing the hook portion 29 of latching hook 27 to ride back from the area bordered by stop means 22. Pipe section 12 is then turned counterclockwise from the position shown in Fig. 3, causing hook portion 29 to engage sloping surface 23 so that a subsequent outward pull of pipe section 12 causes the hook portion 29 to ride up on sloping surface 23 in the manner best seen in Fig. 6 of the drawings. Excessive rotation is prevented by guide and stop shoulder 24. This action results in quickly and easily uncoupling pipe section 12 from tubular member 13.

Because irrigation systems may be laid out on uneven ground, it is essential that a pipe coupling for use with such systems allow misalignment of the longitudinal axes of the pipe sections comprising the system. For this purpose, tubular member 13 includes an outwardly flaring flange portion 38 which, as shown in Fig. 4, tapers outwardly from a small diameter portion adjacent the rearward edge of flange 16 to a larger diameter portion substantially midway between flanges 16 and 17 of the tubular member. By this construction, the longitudinal axis of pipe section 12 can be misaligned from the longitudinal axis of pipe section 11 so that the two pipe sections meet at an angle within tubular member 38. While the amount of misalignment between the axes of the two pipe sections is necessarily restricted by the accommodating space provided by outwardly flaring flange portion 38, the portion is flared outwardly sufficiently so that aggregate misalignment accommodated by all of the couplings in the system allows the system to be set up over relatively uneven ground.

As shown in Figs. 4 and 5 of the drawings, tubular member 13 may be secured to the end of pipe section 11 by means of a plurality of bolts 41, or by other means such as welding, set in a plurality of bolt receiving bosses 42 formed about the periphery of tubular member 13 in a plane spaced from the end of tubular member 13 adapted to receive pipe section 11. Spaced inwardly from the plane containing the bolt receiving bosses 42 on the interior pipe receiving surface of tubular member 13 is an inwardly projecting protrusion 43 which serves as a means for properly aligning the pipe section 11 with the bolts seated in bolt receiving bosses 42. As the distance 44 provided between the end of pipe section 11 and the point in which the bolts 41 are inserted is substantially critical, protrusions 43, in cooperation with the bosses 42, assure that the coupling will be properly connected when originally set up. Consequently, should the pipes composing the system be used with a comparatively high pressure water supply, the tensioning apart of the pipe section and tubular member due to the action of the water will not cause the critical length of pipe 44 between the end of pipe section 11 and the bolt holes therein to be torn out. Thus, a durable attachment to the pipe section is assured.

In order that the coupling provide a substantially water-tight joint, an annular, U-shaped, flexible gasket 46 is seated in flange 16, and a similar gasket 47 is seated in flange 17. Because of their construction, should water work back into the area in which they are seated, the pressure of the water causes the two legs of the gasket to be forced away from each other, increasing water tightness obtained between pipe sections and tubular member 13. This construction of the gaskets also allows them to be easily flexed when misalignment occurs between the axes of the pipes being coupled. As it is desirable that the coupling be retained in an upright position when set up in an irrigation system, a skirt 48 which is integral with the tubular member 13, is provided. As shown in Fig. 5, skirt 48 flares outwardly from the outer periphery of tubular member 13 so as to provide a relatively stable base for the coupling. Skirt 48 also assists in aligning pipe section 12 with the pipe receiving aperture in tubular member 13 during the coupling operation. In order that irrigation sprinkler heads be easily inserted in an irrigating system in which the coupling is used, boss 49 is provided on tubular member 13. Should it be desired to have a sprinkler head at a particular point in the irrigation system, the boss 49 may be reamed and threaded, and a sprinkler head inserted therein.

Under certain circumstances when the particular latch member structure shown in Figs. 1, 2 and 3 of the drawings is used with short sections of pipe, the above described coupling may be accidentally uncoupled due to latching hook 27 working itself around stop shoulder 22. To prevent this from happening, a different type of latching member construction, such as that illustrated in Fig. 7, may be provided. Referring now to Fig. 7, the modified latching member construction comprises a pair of winged, substantially U-shaped brackets 51 and 52 clamped around the end of one of the pipes to be coupled by means of a pair of assembly bolts 53 and 54. Mounted in brackets 51 and 52 ahead of each of the bolts 53 and 54 respectively, is a mounting bolt, not shown, pivotally supporting a latching hook 56 disposed on one side of the pipe, and a second mounting bolt, not shown, pivotally supporting a second latching hook 57 disposed diametrically opposite hook 56. Both hook 56 and hook 57 are identical in construction to latching hook 27 in the embodiment of the invention illustrated in Figs. 1 and 2, and have their free ends thereof biased downwardly by a biasing spring 58 and a biasing spring 59, respectively, acting against the pivoted ends of each of the hooks in a lever-like fashion. Upon a pipe having a latching member construction such as that shown in Fig. 7 being thrust into the tubular coupling member 13, the sloped leading edge 33 of each of the latching hooks 56 and 57 contacts the rounded leading edge 34 of side portions of flange 16. Further movement inward causes each of the latching hooks 56 and 57 to ride over the flange 16, hooking the portion 29 thereof to the back wall of the flange. This action securely couples the pipe to the tubular coupling member in such a fashion that it is practically impossible for the two to become uncoupled accidentally. To uncouple the pipe from the tubular member it is necessary to first manually raise each of the latching hooks against the action of its respective biasing spring, and then separate the two. While such a coupling is not as easily handled as the preferred embodiment of the invention, it is to be remembered that it is used only with short lengths of piping where it has been determined experimentally that it is desirable to do so.

From the foregoing description it can be appreciated that the invention provides a novel pipe coupling for use in an irrigation system. The coupling is designed in such a manner that the irrigation system pipe sections it joins can be easily and quickly coupled and uncoupled. Thus, because the sections can be quickly interchanged, a minimum number of pipe sections are required in the system in order to supply a required amount of water. Further, the coupling is constructed in such a manner that it provides a durable connection that is not easily disassembled accidentally. Systems utilizing the coupling can be laid out over uneven ground due to the design of the coupling, in that it will accommodate limited movement of both the longitudinal and transverse axes of the pipes which it joins relative to each other without in any manner impairing its water-tight joint.

Obviously many modifications and variations of the present invention are possible in the light of the above teachings. It is therefore to be understood that changes may be made herein

What I claim as new and desire to secure by Letters Patent is:

1. In a pipe coupling including a pair of tubular members having their adjacent ends adapted for telescoping engagement, the combination of latching means for connecting said members in assembled telescoped arrangement, including a fixed pivot latch means carried by one of said members, latch engaging outwardly extending flange means carried by the other member, a pair of circumferentially spaced substantially radially offstanding guide means integral with and coextending longitudinally of said flange means and serving for predeterminate positioning circumferentially therebetween of said latch means with said flange means upon longitudinal advancement of said latch means relative to said flange means, stop means functioning in co-operation with said guide means for limiting relative rotary movement of said tubular members including an extension on each of said guide means and a lug positioned between said pair of guide means adjacent the flange means, and ramp means extending from said other member beyond the lug at least as far outwardly as the flange means providing a camming extension merging with the outer surface of the flange means extending to only one of said stop means, whereby upon relative longitudinal telescoping advancement of said members in excess of that necessary for latching engagement of said latching means and flange means beyond the lug upon subsequent rotary movement of said first tubular member toward the ramp means said latching means may be disengaged from said flange means by camming action on the latch means imparted by said ramp means forcing the latch means outwardly of the flange means to ride over the flange means upon separation of said members.

2. Pipe coupling means as claimed in claim 1, wherein the fixed pivot includes a bracket carried by the one of said tubular members, said bracket confining spring means for urging said latch means into positive locking engagement with said flange means.

3. Pipe coupling means as claimed in claim 2, wherein said bracket is provided with internal roughening for securing said bracket against rotary movement relative to said tubular member.

4. Pipe coupling means as claimed in claim 3, wherein a frusto-conical tubular member receiving chamber is formed integral with and in axial extension to said flange means, and diverging therefrom, U-shaped sealing means positioned within said flange means, said chamber providing means for annular adjustment of said telescoped tubular members relative to said chamber and said sealing means thereby preventing leakage while permitting adjustability of said tubular members.

References Cited in the file of this patent
UNITED STATES PATENTS

| Number | Name | Date |
|---|---|---|
| 2,187,119 | Fish | Jan. 16, 1940 |
| 2,449,735 | Wyss | Sept. 21, 1948 |
| 2,464,466 | Stout | Mar. 15, 1949 |
| 2,494,854 | Anderson | Jan. 17, 1950 |
| 2,494,855 | Anderson | Jan. 17, 1950 |
| 2,499,476 | Eyerly | Mar. 7, 1950 |
| 2,510,477 | Montgomery | June 6, 1950 |